United States Patent
Head et al.

(10) Patent No.: US 10,876,871 B2
(45) Date of Patent: Dec. 29, 2020

(54) APPARATUS, SYSTEMS, AND METHODS FOR NON-INVASIVE MEASUREMENT OF FLOW IN A HIGH TEMPERATURE PIPE

(71) Applicant: Abilene Christian University, Abilene, TX (US)

(72) Inventors: Timothy Lawrence Head, Abilene, TX (US); Rusty Towell, Abilene, TX (US)

(73) Assignee: ABILENE CHRISTIAN UNIVERSITY, Abilene, TX (US)

( * ) Notice: Subject to any disclaimer, the term of this patent is extended or adjusted under 35 U.S.C. 154(b) by 0 days.

(21) Appl. No.: 16/508,544

(22) Filed: Jul. 11, 2019

(65) Prior Publication Data

US 2020/0018628 A1 Jan. 16, 2020

Related U.S. Application Data

(60) Provisional application No. 62/697,101, filed on Jul. 12, 2018.

(51) Int. Cl.
*G01F 1/66* (2006.01)
*C04B 28/18* (2006.01)
(Continued)

(52) U.S. Cl.
CPC ............. *G01F 1/667* (2013.01); *C04B 28/18* (2013.01); *G01F 1/662* (2013.01); *G01K 1/143* (2013.01);
(Continued)

(58) Field of Classification Search
CPC combination set(s) only.
See application file for complete search history.

(56) References Cited

U.S. PATENT DOCUMENTS

| 3,303,691 A | * | 2/1967 | Louis Beaujard ..... G01N 29/28 73/644 |
| 4,374,477 A | | 2/1983 | Kikuchi et al. |

(Continued)

FOREIGN PATENT DOCUMENTS

| DE | 4124692 A1 | 1/1993 |
| WO | WO 2015096901 | 7/2015 |

OTHER PUBLICATIONS

Dipl.-Ing. Friedrich Hofmann, "Fundamentals of Ultrasonic-Flow Measurement for Industrial Applications," Krohne Messtechnik GmbH & Co. KG Duisburg, 2000, 31 pages.

(Continued)

*Primary Examiner* — Harshad R Patel
(74) *Attorney, Agent, or Firm* — Haynes and Boone, LLP

(57) ABSTRACT

A method, apparatus, and system according to which first and second transducers are connected to first and second waveguides, respectively, the first and second waveguides are connected to a pipe, and ultrasonic wave signals are exchanged between the first and second transducers, said ultrasonic wave signals passing through the first and second waveguides, the pipe, and a fluid in the pipe. A temperature of the fluid flowing in the pipe may exceed about 600° C. The first and second waveguides insulate the first and second transducers from the pipe and propagate the ultrasonic wave signals between the pipe and the first and second transducers, respectively, so that the ability of the first and second transducers to exchange the ultrasonic wave signals is not adversely affected by the temperature of the fluid in the pipe. The first and second waveguides may be made of a calcium silicate technical ceramic.

24 Claims, 10 Drawing Sheets

(51) Int. Cl.
   *G21C 17/022* (2006.01)
   *G01P 5/24* (2006.01)
(52) U.S. Cl.
   CPC ............ *G01P 5/245* (2013.01); *G21C 17/022* (2013.01); *G01N 2291/02836* (2013.01)

(56) References Cited

U.S. PATENT DOCUMENTS

| | | | | |
|---|---|---|---|---|
| 4,783,997 | A | * | 11/1988 | Lynnworth .............. B06B 3/00 73/644 |
| 4,948,552 | A | * | 8/1990 | Mollot .................... G01F 1/662 73/644 |
| 4,961,347 | A | * | 10/1990 | Arakawa ............... B06B 1/0644 73/644 |
| 5,280,728 | A | | 1/1994 | Sato et al. |
| 5,440,930 | A | * | 8/1995 | Daire ...................... G01N 29/02 73/644 |
| 5,450,753 | A | * | 9/1995 | Maynor ................... G01L 23/28 73/644 |
| 6,047,602 | A | | 4/2000 | Lynnworth |
| 6,983,654 | B2 | * | 1/2006 | Balin .................. G01F 23/2962 73/290 V |
| 7,093,502 | B2 | | 8/2006 | Kupnik et al. |
| 7,322,251 | B2 | | 1/2008 | Gysling et al. |
| 7,343,821 | B2 | | 3/2008 | Panicke et al. |
| 7,707,987 | B2 | | 4/2010 | Guthrie |
| 8,893,558 | B2 | | 11/2014 | Davis et al. |
| 9,295,923 | B2 | | 3/2016 | Mezheritsky et al. |
| 9,347,807 | B2 | * | 5/2016 | Ao .......................... G01N 9/00 |
| 9,557,200 | B2 | | 1/2017 | Forster |
| 9,664,543 | B2 | | 5/2017 | Twerdowski et al. |
| 9,720,171 | B2 | | 8/2017 | Arai |
| 10,317,262 | B2 | * | 6/2019 | Kippersund ............ G01P 5/001 |
| 2013/0199305 | A1 | | 8/2013 | Fernald |
| 2015/0107371 | A1 | | 4/2015 | Khrakovsky |
| 2016/0334255 | A1 | | 11/2016 | Gestner |

OTHER PUBLICATIONS

International Search Report and Written Opinion issued by the U.S. I.S.A. regarding International application No. PCT/US2019/041359 dated Oct. 4, 2019, 14 pages.
International Preliminary Report on Patentability issued by the International Preliminary Examining Authority regarding International Application No. PCT/US2019/041359, dated Jul. 1, 2020, 22 pages.

* cited by examiner

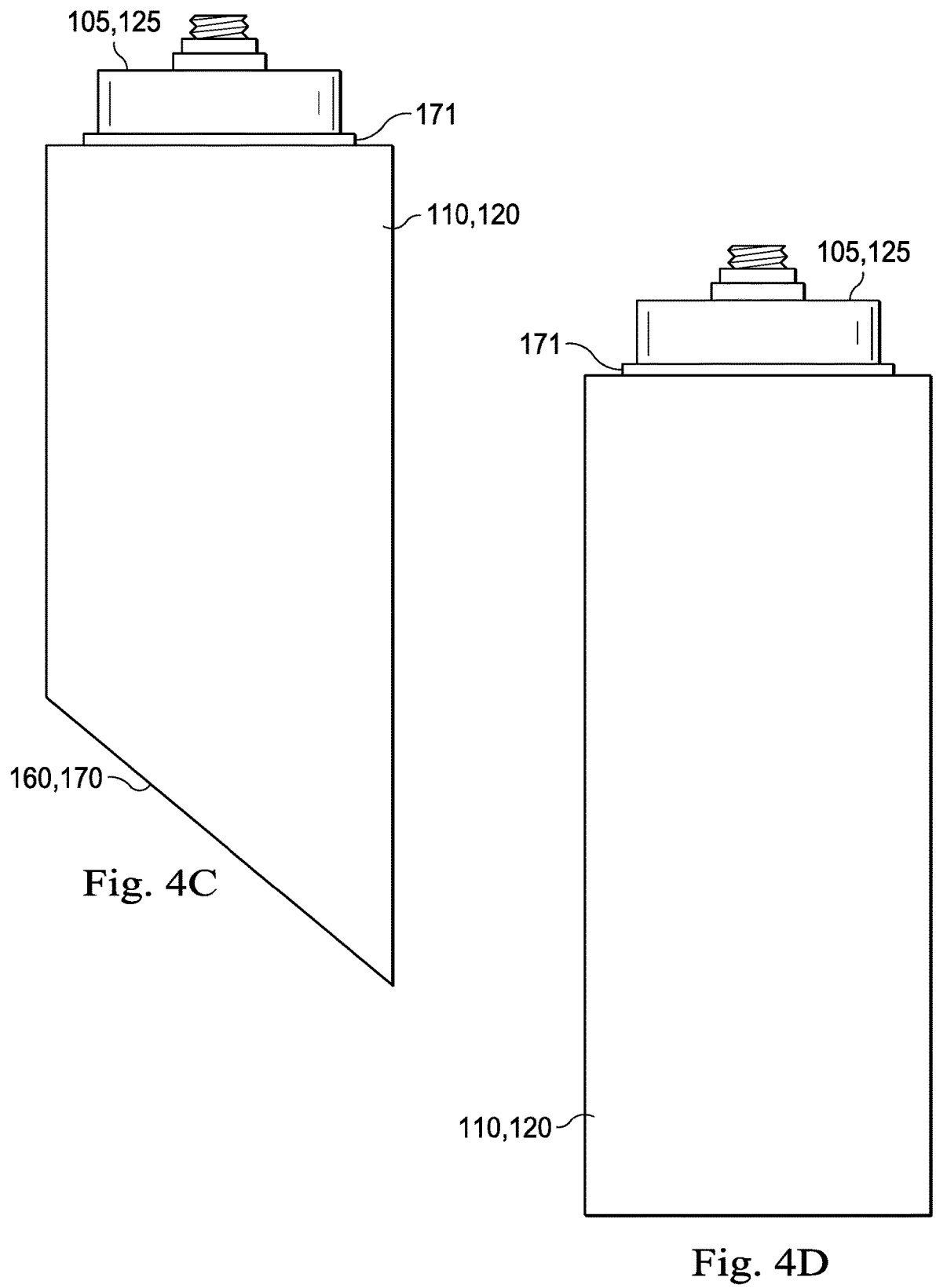

US 10,876,871 B2

APPARATUS, SYSTEMS, AND METHODS FOR NON-INVASIVE MEASUREMENT OF FLOW IN A HIGH TEMPERATURE PIPE

CROSS-REFERENCE TO RELATED APPLICATION

This application claims the benefit of the filing date of, and priority to, U.S. Patent Application Ser. No. 62/697,101, filed Jul. 12, 2018, the entire disclosure of which is hereby incorporated herein by reference.

BACKGROUND

The present disclosure relates generally to flow measurement and, more particularly, to apparatus, systems, and methods for measuring flow in a high temperature pipe.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 4C is a left side elevational view of the waveguide, the transducer, and the connector ring of FIG. 4A, according to one or more embodiments of the present disclosure.

FIG. 4D is a front elevational view of the waveguide, the transducer, and the connector ring of FIG. 4A, according to one or more embodiments of the present disclosure

DETAILED DESCRIPTION

Figure 1:
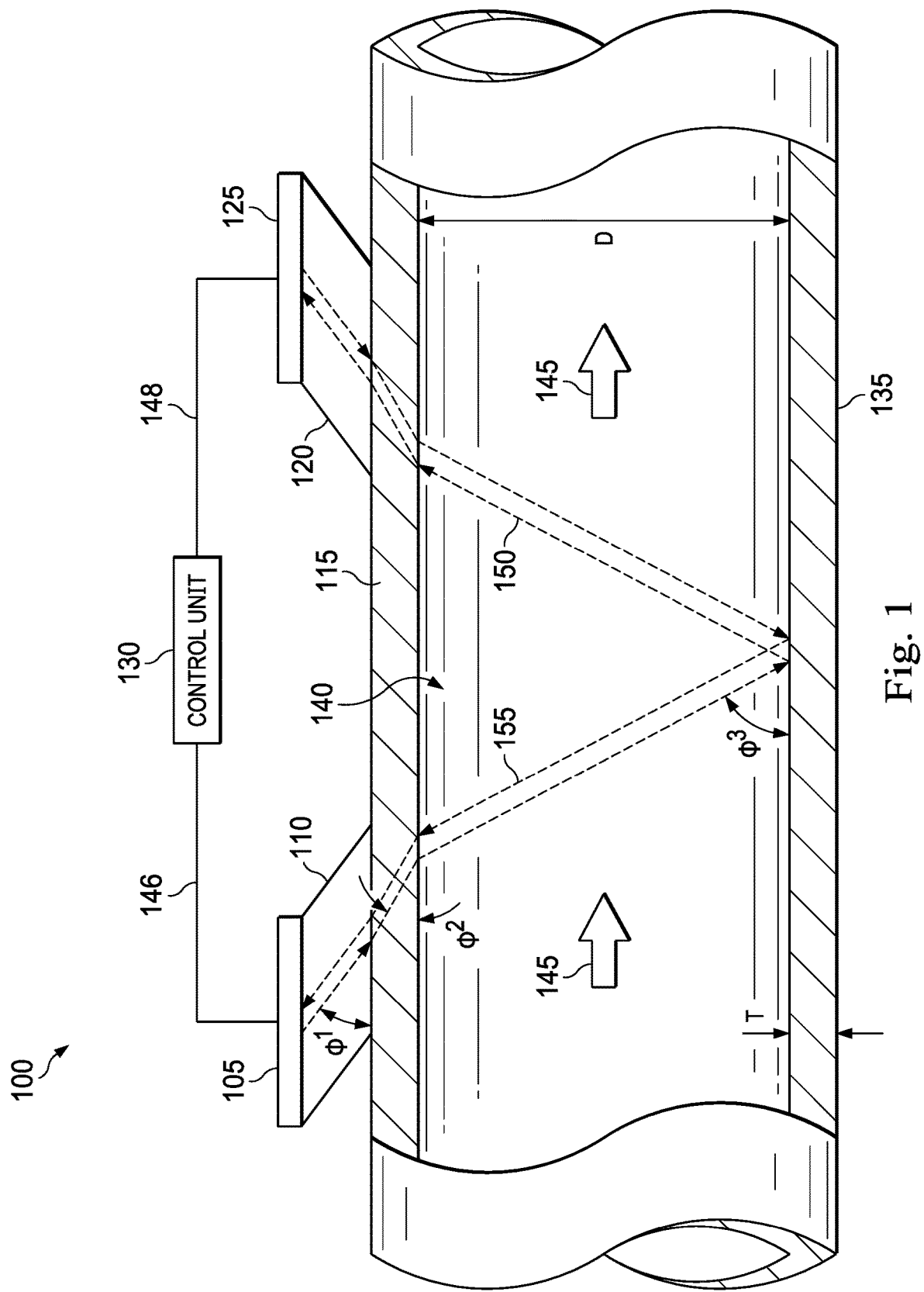
FIG. 1 is a diagrammatic illustration of a system including a pair of waveguides connected to a pipe, a pair of transducers connected to the waveguides, and a control unit in communication with the pair of transducers, according to one or more embodiments of the present disclosure.

In an exemplary embodiment, as illustrated in FIG. 1, a system is schematically illustrated and generally referred to by the reference numeral 100. The system 100 includes a transducer 105 (e.g., an ultrasonic wave transducer), a waveguide 110 (e.g., an ultrasonic waveguide), a pipe 115, a waveguide 120 (e.g., an ultrasonic waveguide), a transducer 125 (e.g., an ultrasonic wave transducer), and a control unit 130. The pipe 115 is a tubular member including an external surface 135 and an internal passage 140 in which a fluid is adapted to flow, as indicated by arrows 145. In several exemplary embodiments, the fluid 145 flowing within the pipe 115 is molten salt. In several exemplary embodiments, the temperature of the fluid 145 flowing within the pipe 115 is equal to or greater than about (i.e., +/−5% to +/−10%) 600° C. In several exemplary embodiments, the temperature of the fluid 145 flowing within the pipe 115 is equal to or greater than about 700° C. In several exemplary embodiments, the temperature of the fluid 145 flowing within the pipe 115 is equal to or greater than about 750° C. The pipe 115 defines an internal diameter D and a wall thickness T. The system 100 is operable to measure the flow velocity (and thus the mass or volumetric flow rate) of the fluid 145 flowing in the pipe 115, as will be described in further detail below. In several exemplary embodiments, the waveguides 110 and 120, the transducers 105 and 125, and the control unit 130 form a kit usable to measure the flow velocity and the mass/volumetric flow rate of fluid flowing in pipes of varying diameters, including the pipe 115.

Figure 2B:
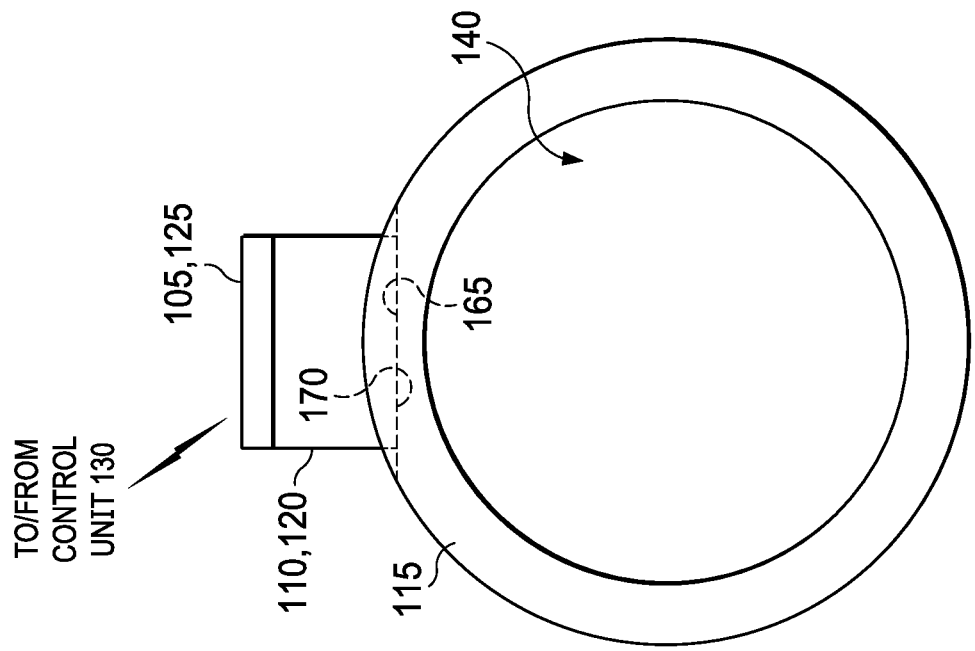
FIG. 2B is an end view of a second implementation of the system of FIG. 1 in which an external surface of the pipe is machined to mate with the pair of waveguides, according to one or more embodiments of the present disclosure.
Figure 2A:
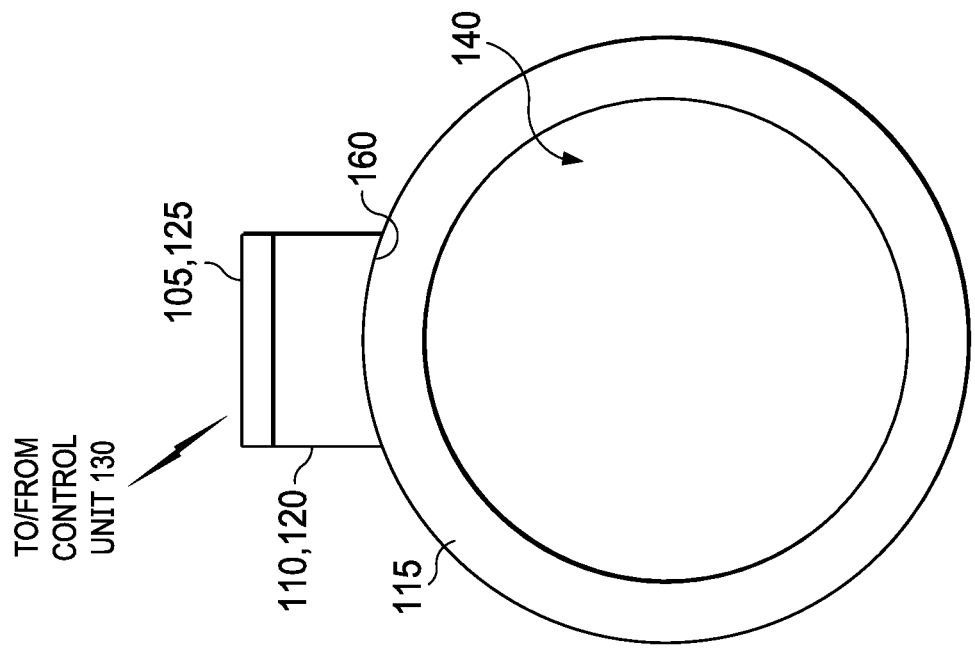
FIG. 2A is an end view of a first implementation of the system of FIG. 1 in which the pair of waveguides are machined to mate with an external surface of the pipe, according to one or more embodiments of the present disclosure.

The transducer 105 is connected to the waveguide 110, which, in turn, is connected to the pipe 115. Similarly, the transducer 125 is connected to the waveguide 120, which, in turn, is connected to the pipe 115. The control unit 130 is in communication with the transducers 105 and 125 via, for example, leads 146 and 148, respectively. In addition to, or instead of, being in communication with the transducers 105 and 125 via the leads 146 and 148, respectively, the control unit 130 may be in wireless communication with the transducers 105 and 125, as shown in FIGS. 2A and 2B. In the embodiment of FIG. 1, the transducers 105 and 125 are spaced longitudinally along the pipe 115 and are located in alignment with each other on the same side of the pipe 115.

The transducer(s) 105 and/or 125 is/are configured to emit and receive ultrasonic wave signals (e.g., short ultrasonic wave pulses) that travel through the waveguides 110 and 120, the pipe 115, and the fluid 145 flowing in the pipe 115. For example, as shown in FIG. 1, the transducers 105 and 125 are configured to emit and receive ultrasonic wave signals (e.g., short ultrasonic wave pulses) that travel through the waveguides 110 and 120, the pipe 115, and the fluid 145 flowing in the pipe 115. In the embodiment of FIG. 1, the ultrasonic wave signals are reflected off the interior wall of the pipe 115 opposite the transducers 105 and 125. Due to the flow of the fluid 145 flowing in the pipe 115, the transit time of the ultrasonic wave signals from the transducer 105 to the transducer 125 (as indicated by arrows 150) is shorter than the transit time of the ultrasonic wave signals from the transducer 125 to the transducer 105 (as indicated by arrows 155), and this transit time difference yields a precise measurement of the flow velocity and the mass/volumetric flow rate along the path of the ultrasonic wave signals 150 and 155, as will be described in further detail below.

Since the transit time difference can be very small for some pipe diameters (e.g., on the scale of nanoseconds), it is important for the control unit 130 to be capable of ensuring the necessary time resolution to obtain an accurate measurement of the flow velocity and the mass/volumetric flow rate of the fluid 145 flowing in the pipe 115. In several exemplary embodiments, the control unit 130, which is configurable to send control signals effecting an exchange of ultrasonic wave signals between the transducers 105 and 125 and to evaluate the ultrasonic wave signals received by the transducers 105 and 125, is capable of ensuring the necessary time resolution. In several exemplary embodiments, the transducer(s) 105 and/or 125 is/are capable of exchanging (i.e., transmitting and receiving) ultrasonic wave signals in a frequency range that is as low as possible while still maintaining the time resolution necessary for a particular pipe diameter (e.g., for a 1-inch pipe diameter, the minimum frequency required may be in the range of 500 kHz to 10 MHz). In several exemplary embodiments, the transducer(s) 105 and/or 125 and the control unit 130 are capable of capturing ultrasonic waveform data in the form of a standard longitudinal mode A-scan, in which echo amplitude and transit time are plotted on a simple grid with the vertical axis representing amplitude and the horizontal axis representing time.

In several exemplary embodiments, the transducer(s) 105 and/or 125 is/are capacitive transducers. In several exemplary embodiments, the transducer(s) 105 and/or 125 have a diameter of about ½-inch. In several exemplary embodiments, the transducer(s) 105 and/or 125 is/are capable of transmitting and/or receiving 1 MHz ultrasonic wave signals. In several exemplary embodiments, the transducer(s) 105 and/or 125 is/are capable of transmitting and/or receiving 2.25 MHz ultrasonic wave signals. In several exemplary embodiments, the transducer(s) 105 and/or 125 is/are contained in threaded package(s) that is/are convenient for making good acoustic contact with the insulating waveguides 110 and 120, respectively, as will be described in further detail below in connection with FIGS. 4A-4F. In several exemplary embodiments, the transducer(s) 105 and/or 125 is/are integrated into the material of the insulating waveguides 110 and 120, respectively. In several exemplary embodiments, the transducer(s) 105 and/or 125 is/are Olympus Centrascan Composite Angle Beam Transducer(s) capable of transmitting and/or receiving 1.00 MHz ultrasonic wave signals, having ½-inch element diameter(s), and being of the miniature screw-in case style (i.e., Olympus Part/Item No. C539-SM).

Figure 3A:
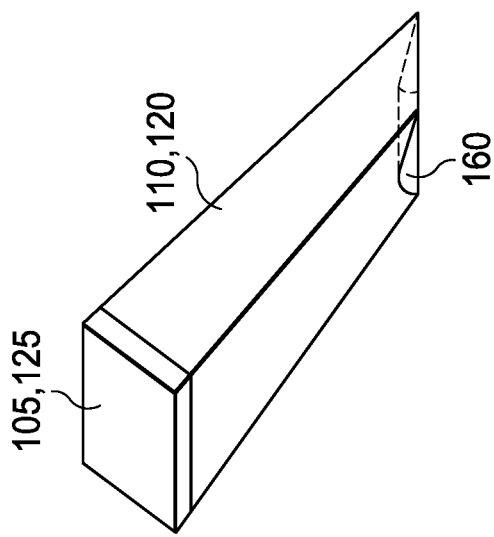
FIG. 3A is a perspective view illustrating a first implementation of one of the waveguides of FIG. 1, according to one or more embodiments of the present disclosure.
Figure 3B:
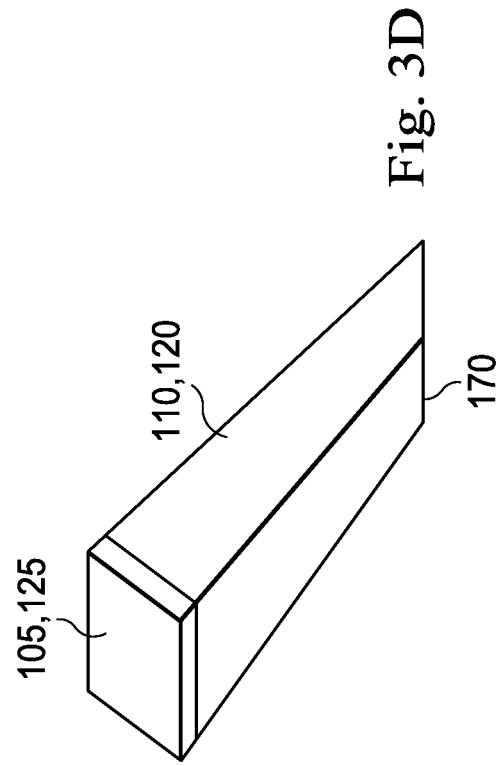
FIG. 3B is a perspective view illustrating a second implementation of one of the waveguides of FIG. 1, according to one or more embodiments of the present disclosure.
Figure 3C:
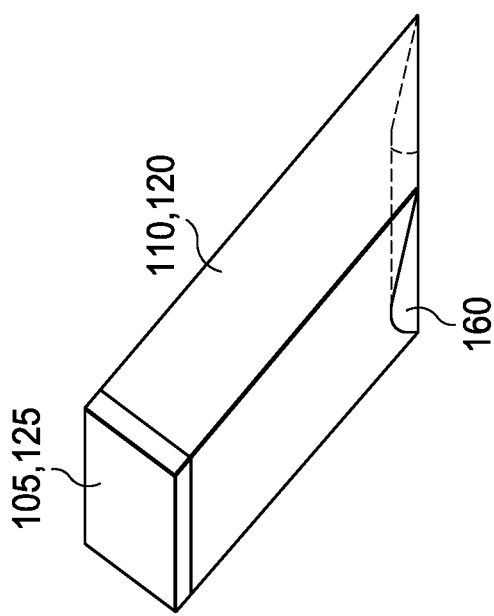
FIG. 3C is a perspective view illustrating a third implementation of one of the waveguides of FIG. 1, according to one or more embodiments of the present disclosure.
Figure 3D:
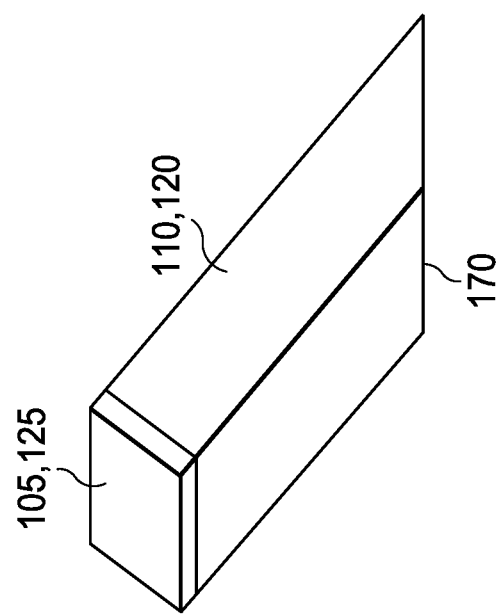
FIG. 3D is a perspective view illustrating a fourth implementation of one of the waveguides of FIG. 1, according to one or more embodiments of the present disclosure.

In several exemplary embodiments, as shown in FIGS. 2A, 3A, and 3B, the shape of the waveguide(s) 110 and/or 120 is/are modified to enable mating engagement between the waveguide(s) 110 and/or 120 and the pipe 115. For example, in several exemplary embodiments, the waveguide(s) 110 and/or 120 is/are machined to include surface(s) 160 (e.g., curved surfaces) configured to matingly engage with the external surface 135 of the pipe 115. In other embodiments, as shown in FIGS. 2B, 3C, and 3D, the external surface 135 of the pipe 115 is machined to include surface(s) 165 (e.g., flat surface(s) and/or curved surface(s)) configured to matingly engage with corresponding surface(s) 170 (e.g., flat surface(s) and/or curved surface(s)) of the waveguide(s) 110 and/or 120. In one such experimental embodiment in which the internal diameter D of the pipe 115 is sufficiently small (e.g., equal to or less than 3 inches) as compared to the contact areas between the waveguide(s) 110 and/or 120 and the pipe 115, machining of the external surface 135 of the pipe 115 to include flat surface(s) 165 increases transmission of the ultrasonic wave signal into the pipe 115 by a factor of about 10. In addition to, or instead of, machining the external surface 135 of the pipe 115, material can be added to the external surface 135 of the pipe 115 to form surface(s) (not shown but, e.g., flat surface(s) and/or curved surface(s)) configured to matingly engage with corresponding surface(s) such as, for example, flat surface(s) and/or curved surface(s) of the waveguide(s) 110 and/or 120).

Turning back to FIG. 1, with continuing reference to FIGS. 2A-B and 3A-D, the mating engagement between the waveguide(s) 110 and/or 120 and the pipe 115 ensures proper position and orientation of the waveguide(s) 110 and/or 120 relative to the pipe 115 for optimal operation of the system 100. More particularly, the transducer(s) 105 and/or 125 is/are mounted to the waveguides 110 and 120 in a manner that facilitates emission and reception of ultrasonic wave signals through the waveguides 110 and 120 at an angle $\varphi^1$ with respect to a longitudinal axis of the pipe 115. Any change to the angle $\varphi^1$ results in a corresponding change to an angle $\varphi^2$ at which the ultrasonic wave signals travel through the wall of the pipe 115 and an angle $\varphi^3$ at which the ultrasonic wave signals travel through the fluid 145 flowing in the pipe 115. In several exemplary embodiments, the angle $\varphi^1$ is greater than or equal to about 70 degrees. In several exemplary embodiments, the angle $\varphi^1$ is greater than or equal to about 40 degrees and less than or equal to about 70 degrees. In several exemplary embodiments, the angle $\varphi^2$ is less than the angle $\varphi^1$. In several exemplary embodiments, the angle $\varphi^3$ is greater than the angle $\varphi^2$.

The angle $\varphi^1$ is carefully set to optimize acoustic transmission of the ultrasonic wave signals through and between the waveguides 110 and 120, the pipe 115, and the fluid 145 flowing in the pipe 115; this optimal angle is characterized as the angle of maximum transmission. The angle of maximum transmission depends at least in part on the internal diameter D of the pipe 115, the wall thickness T of the pipe 115, the size and shape of the waveguide(s) 110 and/or 120, the respective sound velocities of the waveguide(s) 110 and/or 120, the pipe 115, and the fluid 145 flowing in the pipe 115, the potential for mode conversion at the interface between each waveguide 110 and 120 and the external surface 135 of the pipe 115, and/or the potential for mode conversion at the interface between the pipe 115 and the fluid 145 flowing in the pipe 115.

In an exemplary embodiment, as shown in FIGS. 3A-D with continuing reference to FIGS. 1 and 2, the insulative and acoustic properties of the waveguides 110 and 120 are controlled at least in part by the dimensions (i.e., the shape and size) of the waveguides 110 and 120 between the high temperature pipe 115 and the transducers 105 and 125. If the working temperature of the transducers 105 and 125 exceeds a critical threshold, the transducers 105 and 125 will fail. Likewise, if the attenuation of the ultrasonic wave signal within the waveguides 110 and 120 is too large, the ultrasonic wave signal will not be detectable by the transducers 105 and 125. The waveguides 110 and 120 are shaped to insulate the transducers 105 and 125 from the high-temperature pipe 115 so that the working temperature of the transducers 105 and 125 does not exceed the critical threshold while, at the same time, the inherent attenuation of the ultrasonic wave signals in the waveguides 110 and 120 is maintained at an acceptable level. For example, in several exemplary embodiments, the waveguide(s) 110 and/or 120 is/are formed in the shape of a rectangular prism, as shown in FIGS. 3A-D. The waveguide(s) 110 and/or 120 can also be tapered to reduce the hot contact area between the waveguide(s) 110 and/or 120 and the high-temperature pipe 115, as shown in FIGS. 3B and 3D.

Although shown and described as being either a rectangular prism or a tapered rectangular prism, the waveguide(s) 110 and/or 120 may instead be formed in the shape of a circular prism (i.e., a cylinder), a tapered circular cylinder, a triangular prism, a tapered triangular prism, a pentagonal prism, a tapered pentagonal prism, another round prism, another tapered round prism, another polygonal prism, another tapered polygonal prism, or any combination thereof.

In several exemplary embodiments, at least respective portions of the waveguide(s) 110 and/or 120 are made of a high-temperature ceramic material. In several exemplary embodiments, at least respective portions of the waveguide(s) 110 and/or 120 are made of a calcium silicate material. In several exemplary embodiments, at least respective portions of the waveguide(s) 110 and/or 120 are made of a calcium silicate technical ceramic, which is marketed under the trademark Duratec® (e.g., Duratec® 750). In several exemplary embodiments, at least respective portions of the waveguide(s) 110 and/or 120 are made of a material having an operating temperature of up to about 1000° C. In several exemplary embodiments, at least respective portions of the waveguide(s) 110 and/or 120 are made of a material having a thermal conductivity of about 0.49 watts per meter-kelvin (W/m*K) or lower at about 750° C. In several exemplary embodiments, at least respective portions of the waveguide(s) 110 and/or 120 are made of a material that is machinable (i.e., able to be worked by a machine tool) or otherwise formable into an appropriate shape. In several exemplary embodiments, at least respective portions of the waveguide(s) 110 and/or 120 are made of a material having a sound velocity in the range of about 2200 to 3500 meters per second (m/s). In several exemplary embodiments, at least respective portions of the waveguide(s) 110 and/or 120 are made of a material having a sound velocity of about 2270 meters per second (m/s) (+/−75 m/s).

Figure 4A:
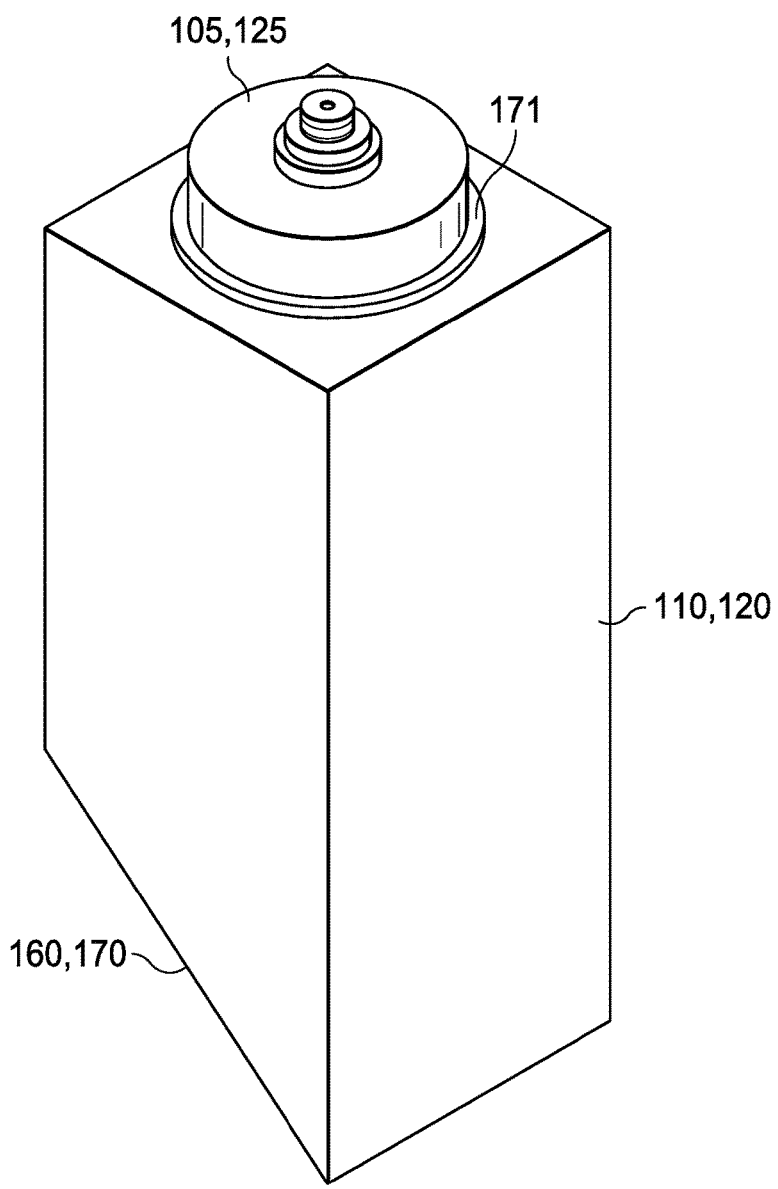
FIG. 4A is a perspective view illustrating a fifth implementation of one of the waveguides of FIG. 1 in which one of the transducers of FIG. 1 is connected to said waveguide via a connector ring, according to one or more embodiments of the present disclosure.
Figure 4B:
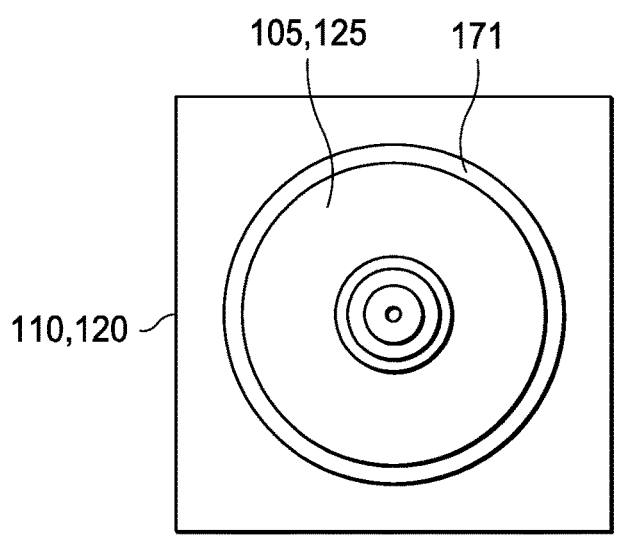
FIG. 4B is a top plan view of the waveguide, the transducer, and the connector ring of FIG. 4A, according to one or more embodiments of the present disclosure.
Figure 4E:
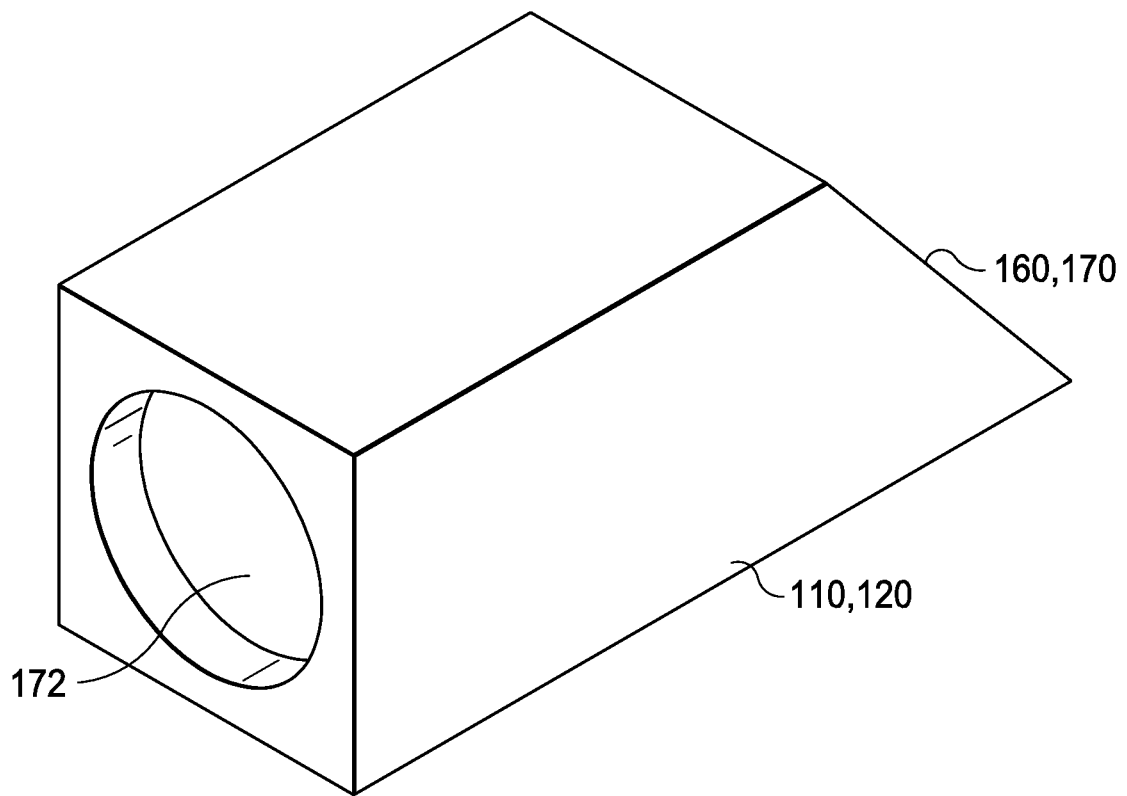
FIG. 4E is a perspective view of the waveguide of FIG. 4A, according to one or more embodiments of the present disclosure.
Figure 4F:
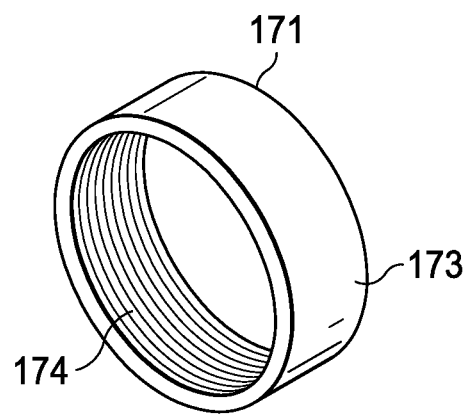
FIG. 4F is a perspective view of the connector ring of FIG. 4A, according to one or more embodiments of the present disclosure.

In an exemplary embodiment, as shown in FIGS. 4A-4F, the transducer(s) 105 and/or 125 is/are contained in threaded package(s) that is/are convenient for making good acoustic contact with the insulating waveguide(s) 110 and/or 120, respectively. More particularly, the transducer(s) 105 and/or 125 is/are each connected to the waveguide(s) 110 and/or 120, respectively, via a connector ring 171. In several exemplary embodiments, the connector ring 171 is, includes, or is part of, the waveguide(s) 110 and/or 120. Turning to FIG. 4E, in an exemplary embodiment, a recess 172 is formed in an end portion of the waveguide(s) 110 and/or 120 opposite the surface that engages the pipe 115 (e.g., the surface 160 and/or 170). The recess 172 formed in the waveguide(s) 110 and/or 120 receives the connector ring 171 and the transducer(s) 105 and/or 125, as shown in FIGS. 4A-4D. Turning to FIG. 4F, in an exemplary embodiment, the connector ring 171 is generally tubular and includes an external surface 173 and an internal threaded connection 174. In several exemplary embodiments, the external surface 173 of the connector ring 171 is fitted (e.g., press-fit, interference-fit, clearance-fit, shrunk-fit, the like, or any combination thereof) into the recess 172 in such a manner that the connector ring 171 is retained within the recess 172. For example, a frictional fit between the external surface 173 of the connector ring 171 and the waveguide(s) 110 and/or 120 may at least partially retain the connector ring 171 within the recess 172. For another example, an adhesive (not shown) may at least partially retain the connector ring 171 within the recess 172. For yet another example, a retaining ring (not shown) may at least partially retain the connector ring 171 within the recess 172. In several embodiments, the connector ring 171 is made of a relatively more ductile and/or less brittle material than the waveguide(s) 110 and/or 120. As shown in FIGS. 4A-4D, once the connector ring 171 is secured within the recess 172, the transducer(s) 105 and/or 125 is/are threaded into the connector ring 171 to thereby secure the transducer(s) 105 and/or 125 to the waveguide(s) 110 and/or 120.

In operation, as illustrated in FIG. 1, in an exemplary embodiment, the control unit 130 sends a control signal (e.g., a high-voltage pulse) to the transducer 105 (e.g., wirelessly or via the lead 146) and waits for a response from the transducer 125 (e.g., wirelessly or via the lead 148). The control signal sent to the transducer 105 by the control unit 130 causes the transducer 105 to emit an ultrasonic wave signal along the path 150. More particularly, the transducer 105 emits the ultrasonic wave signal at the angle $\varphi^1$ into the waveguide 110. The ultrasonic wave signal emitted into the waveguide 110 at the angle $\varphi^1$ travels through the waveguide 110 and crosses the interface between the waveguide 110 and the external surface 135 of the pipe 115. After crossing the interface between the waveguide 110 and the external surface 135 of the pipe 115, the ultrasonic wave signal travels through the wall of the pipe 115 at the angle $\varphi^2$. After travelling through the wall of the pipe 115, the ultrasonic wave signal travels into the fluid 145 flowing in the pipe 115 at the angle $\varphi^3$. The ultrasonic wave signal is then reflected off the interior wall of the pipe 115 opposite the transducers 105 and 125 and travels in a similar manner through the fluid 145 flowing in the pipe 115, through the wall of the pipe 115, across the interface between the external surface 135 of the pipe 115 and the waveguide 120, through the waveguide 120, and into the transducer 125. The transducer 125 sends a response (e.g., wirelessly or via the lead 148) to the control unit 130 based on the ultrasonic wave signal. The control unit 130 receives the response from the transducer 125, and amplifies/filters the response received from the receiving transducer 125.

Before, during, or after the control unit 130 sends the control signal to the transducer 105 (e.g., wirelessly or via the lead 146) and waits for the response from the transducer 125 (e.g., wirelessly or via the lead 148), the control unit 130 sends a control signal (e.g., a high-voltage pulse) to the transducer 125 (e.g., wirelessly or via the lead 148) and waits for a response from the transducer 105 (e.g., wirelessly or via the lead 146). The control signal sent to the transducer 125 by the control unit 130 causes the transducer 125 to emit an ultrasonic wave signal along the path 155 in a manner similar to that described above with respect to the ultrasonic wave signal emitted along the path 150 by the transducer 120, and therefore will not be described in further detail. Once the ultrasonic wave signal has traveled along the path 155, the transducer 105 sends a response (e.g., wirelessly or via the lead 146) to the control unit 130 based on the ultrasonic wave signal. The control unit 130 receives the response from the transducer 105, and amplifies/filters the response received from the receiving transducer 105. The controller 130 then calculates the transit time and the transit time difference between the ultrasonic wave signal that travelled along the path 150 and the ultrasonic wave signal that travelled along the path 155 to determine the flow velocity (and thus the mass or volumetric flow rate) of the fluid 145 flowing in the pipe 115.

In several exemplary embodiments, at least respective portions of the waveguide(s) 110 and/or 120 are sized, shaped, and/or made of material(s) having acceptable acoustic and insulative properties so that, during operation: (i) the transducer(s) 105 and/or 125 can be mounted to the waveguide(s) 110 and/or 120, respectively, (ii) the waveguide(s) 110 and/or 120 can be mounted on the external surface 135 of the high temperature pipe 115, and (iii) the transducer(s) 105 and/or 125 can be used to non-invasively and accurately measure the flow rate of the fluid 145 flowing in the pipe 115, notwithstanding the high temperature (e.g., ≥600° C., ≥700° C., and/or 750° C.) of the fluid 145 flowing in the pipe 115. In several exemplary embodiments, at least respective portions of the waveguides 110 and 120 are sized, shaped, and/or made of material(s) having acceptable acoustic properties so that, during operation, the transducers 105 and 125 can send and receive ultrasonic wave signals to/from each other. In several exemplary embodiments, at least respective portions of the waveguide(s) 110 and/or 120 are sized, shaped, and/or made of material(s) having acceptable insulative properties so that, during operation, the ability of the transducers 105 and 125 to exchange the ultrasonic wave signals is not adversely affected by the high temperature (e.g., ≥600° C., ≥700° C., and/or ≥750° C.) of the fluid 145 flowing in the pipe 115. In several exemplary embodiments, at least respective portions of the waveguide(s) 110 and/or 120 are sized, shaped, and/or made of material(s) having acceptable insulative properties so that, during operation, the transducer(s) 105 and/or 125 do not act as "heat sink(s)" drawing excessive heat out of the pipe 115.

Examples of size(s) and/or shape(s) in which at least respective portions of the waveguide(s) 110 and/or 120 may be formed in order to exhibit the acceptable acoustic and insulative properties described above include, but are not limited to, the size(s) and/or shape(s) shown in FIGS. 3A-3D and 4A-4F. Examples of material(s) from which at least respective portions of the waveguide(s) 110 and/or 120 may be made in order to exhibit the acceptable acoustic and insulative properties described above include, but are not limited to, high-temperature ceramic material(s), calcium silicate material(s), calcium silicate technical ceramic(s), material(s) having an operating temperature of up to about 1000° C., material(s) having a thermal conductivity of about 0.49 watts per meter-kelvin (W/m*K) or lower at about 750° C., material(s) that is/are machinable, material(s) having a sound velocity in the range of about 2200 to 3500 meters per second (m/s) (e.g., having a sound velocity of about 2270 meters per second (m/s) (+/−75 m/s)), or any combination thereof. Other important acoustic properties of material(s) from which at least respective portions of the waveguide(s) 110 and/or 120 may be made in order to exhibit the acceptable acoustic and insulative properties described above include, but are not limited to, acoustic attenuation, which must be small enough to permit ultrasonic wave signals from one of the transducers 105 or 125 to pass through the waveguides 110 and 120 and be detected by the other of the transducers 105 or 125.

In several exemplary embodiments, the control signal(s) sent to the transducer(s) 105 and/or 125 by the control unit 130 are single wave high voltage pulse(s). In one such embodiment, the leads 146 and 148 from the control unit 130 to the transducers 105 and 125 are physically switched to measure the transit time of the ultrasonic wave signals with and against the flow of the fluid 145 flowing in the pipe 115 (i.e., along the paths 150 and 155, respectively). In several exemplary embodiments, the control signal(s) sent to the transducer(s) 105 and/or 125 by the control unit 130 is/are high amplitude pulse(s) of about 250 V.

In other embodiments, the control signal(s) sent to the transducer(s) 105 and/or 125 by the control unit 130 have a high voltage wave-pulse train (e.g., 5-10 oscillations) to enable more accurate measurement of the time difference between the ultrasonic wave signals with and against the flow of the fluid 145 flowing in the pipe 115 (i.e., along the paths 150 and 155, respectively). The known frequency of the high voltage wave-pulse train allows for easier detection of the ultrasonic wave signals by the receiving transducer(s) 105 and/or 125. In several exemplary embodiments, the high voltage wave-pulse train sent to the transducer(s) 105 and/or 125 by the control unit 130 contains high amplitude pulses of up to about 300 V. To facilitate generation of the high voltage wave-pulse train, the control unit 130 includes electronics (e.g., hardware and/or software) capable of receiving power from a USB or AC wall plug and generating a high-frequency (e.g., 1 MHz, or another frequency matching that of the transducer(s) 105 and/or 125) high-voltage wave-pulse train. The control unit 130 may also include electronics (e.g., hardware and/or software) capable of automatically switching between send and receive modes so that no physical connection(s) need to be changed in order to measure the transit time of the ultrasonic wave signals travelling in opposite directions with respect to the flow of the fluid 145 flowing in the pipe 115 (i.e., along the paths 150 and 155). The control unit 130 may also include electronics (e.g., hardware and/or software) capable of determining the velocity (and thus the mass or volumetric flow rate) of the fluid 145 flowing in the pipe 115 based on the time difference between the ultrasonic wave signals propagating in opposite directions with respect to the flow of the fluid 145 in the pipe 115 (i.e., along the flow paths 150 and 155).

Figure 5:
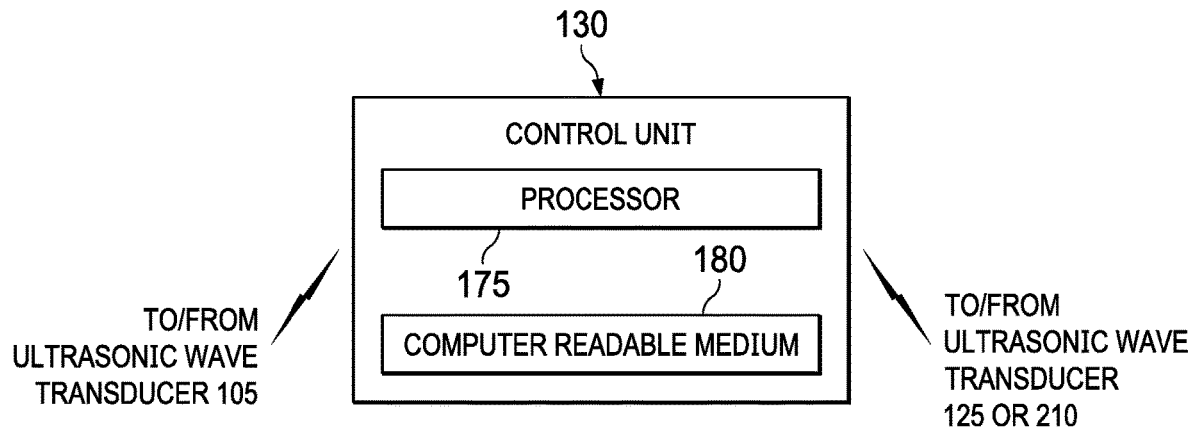
FIG. 5 is a diagrammatic view of a control unit adapted to be in communication with one or more components (or sub-components) of the system of FIG. 1, according one or more embodiments of the present disclosure.

In an exemplary embodiment, as illustrated in FIG. 5 with continuing reference to FIGS. 1, 2A-B, 3A-D, and 4A-F, the control unit 130 includes a processor 175 and a non-transitory computer readable medium 180 operably coupled thereto. A plurality of instructions are stored on the non-transitory computer readable medium 180, the instructions being accessible to, and executable by, the processor 175. In several exemplary embodiments, as shown in FIGS. 1, 2A-B, and 5, the control unit 130 is in communication with the transducers 105 and 125. In several exemplary embodiments, a plurality of instructions, or computer program(s), are stored on the non-transitory computer readable medium 180, the instructions or computer program(s) being accessible to, and executable by, one or more processors (e.g., the processor 175). In several exemplary embodiments, the one or more processors (e.g., the processor 175) execute the plurality of instructions (or computer program(s)) to operate in whole or in part the above-described embodiments. In several exemplary embodiments, the one or more processors (e.g., the processor 175) is/are part of the control unit 130, one or more other computing devices, or any combination thereof. In several exemplary embodiments, the non-transitory computer readable medium 180 is part of the control unit 130, one or more other computing devices, or any combination thereof.

Figure 6:
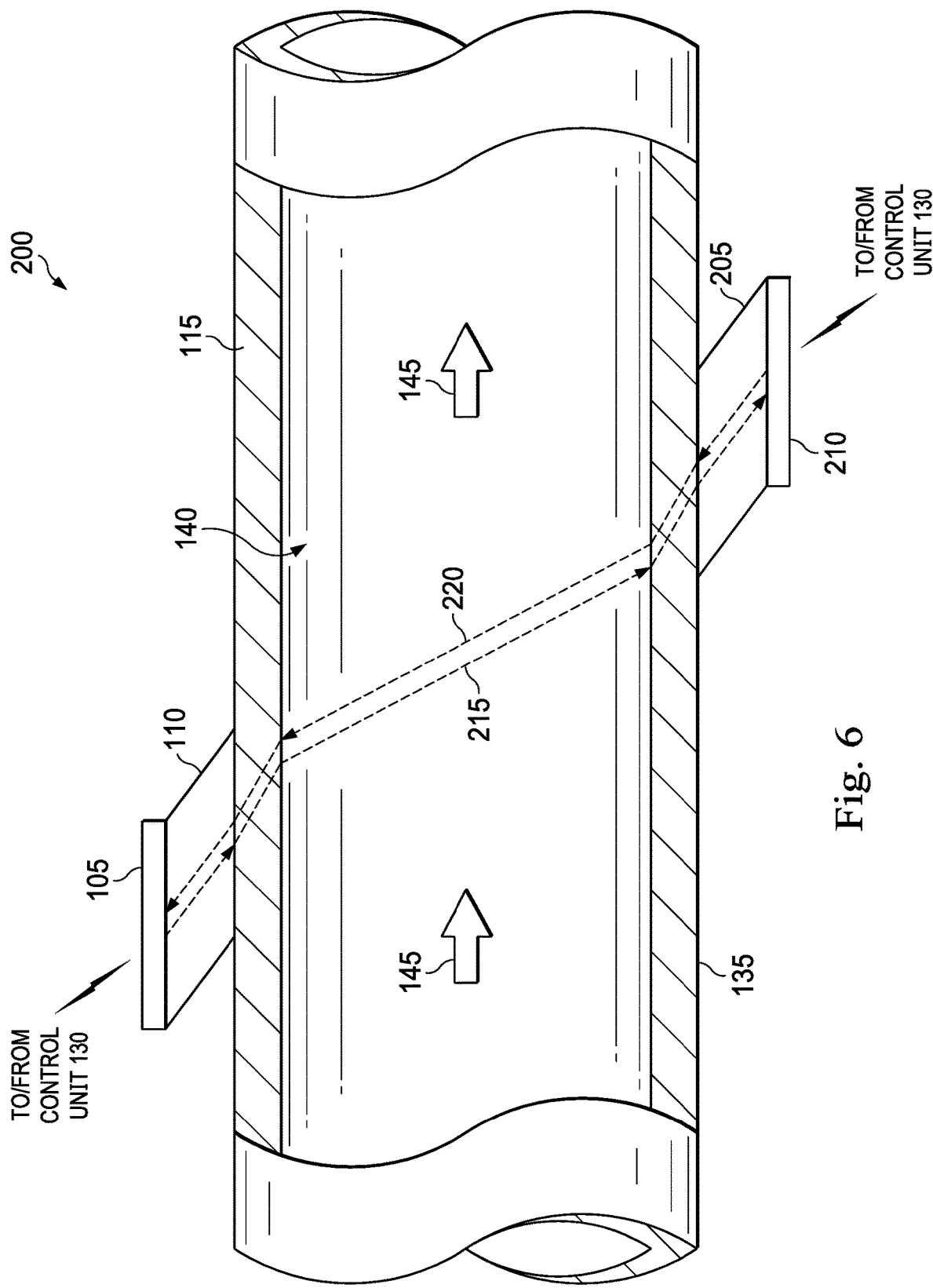
FIG. 6 is a diagrammatic illustration of another system including a pair of waveguides connected to a pipe, a pair of transducers connected to the waveguides, and a control unit in communication with the pair of transducers, according to one or more embodiments of the present disclosure.

In an exemplary embodiment, as illustrated in FIG. 6, a system is schematically illustrated and generally referred to by the reference numeral 200. The system 200 includes one or more feature(s)/component(s) that are substantially identical to corresponding feature(s)/component(s) of the system 100, which substantially identical feature(s)/component(s) are given the same reference numerals. However, the waveguide 120 and the transducer 125 are omitted from the system 200 and replaced with a waveguide 205 (e.g., an ultrasonic waveguide) and a transducer 210 (e.g., an ultrasonic wave transducer). The transducer 210 is connected to the waveguide 205, which, in turn, is connected to the pipe 115. The control unit 130 is in wireless communication with the transducers 105 and 210, as shown in FIG. 6. In addition to, or instead of, being in wireless communication with the transducers 105 and 210, the control unit 130 may be in communication with the transducers 105 and 210 via leads (not shown but, e.g., substantially identical to the leads 146 and 148 shown in FIG. 1). The transducers 105 and 210 are spaced longitudinally along the pipe 115 and are located diagonally offset from each other on opposing sides of the pipe 115. In several exemplary embodiments, the waveguide 205 the transducer 210 of the system 200 are substantially identical to the waveguide 120 and the transducer 125, respectively, of the system 100, except for their differing location(s) on the pipe 115.

The transducer(s) 105 and/or 210 of the system 200 is/are configured to emit and receive ultrasonic wave signals that travel through the waveguides 110 and 205, the pipe 115, and the fluid 145 flowing in the pipe 115. For example, as shown in FIG. 6, the transducers 105 and 210 of the system 200 are configured to emit and receive ultrasonic wave signals that travel through the waveguides 110 and 205, the pipe 115, and the fluid 145 flowing in the pipe 115. In the embodiment of FIG. 6, the ultrasonic wave signals of interest are not reflected off the interior wall of the pipe 115 opposite the transducer 105, but instead pass through the fluid 145 directly from the interior wall of the pipe 115 proximate the transducer 105 to the interior wall of the pipe 115 proximate the transducer 210. Due to the flow of the fluid 145 flowing in the pipe 115, the transit time of the ultrasonic wave signals from the transducer 105 to the transducer 210 (as indicated by arrows 215) is shorter than the transit time of the ultrasonic wave signals from the transducer 210 to the transducer 105 (as indicated by arrows 220), and this transit time difference yields a precise measurement of the flow velocity and the mass/volumetric flow rate along the path of the ultrasonic wave signals 215 and 220.

The operation of the system 200 is substantially identical to the operation of the system 100, except that, rather than reflecting off the interior wall of the pipe 115 opposite the transducers 105 and 125 and traveling through the fluid 145 flowing in the pipe 115 along the paths 150 and 155, the ultrasonic wave signals generated by the transducer(s) 105 and/or 210 pass through the fluid 145 directly from the interior wall of the pipe 115 proximate the transducer 105 to the interior wall of the pipe 115 proximate the transducer 210 along the paths 215 and 220. Therefore, the operation of the system 200 will not be described in further detail.

Figure 7:
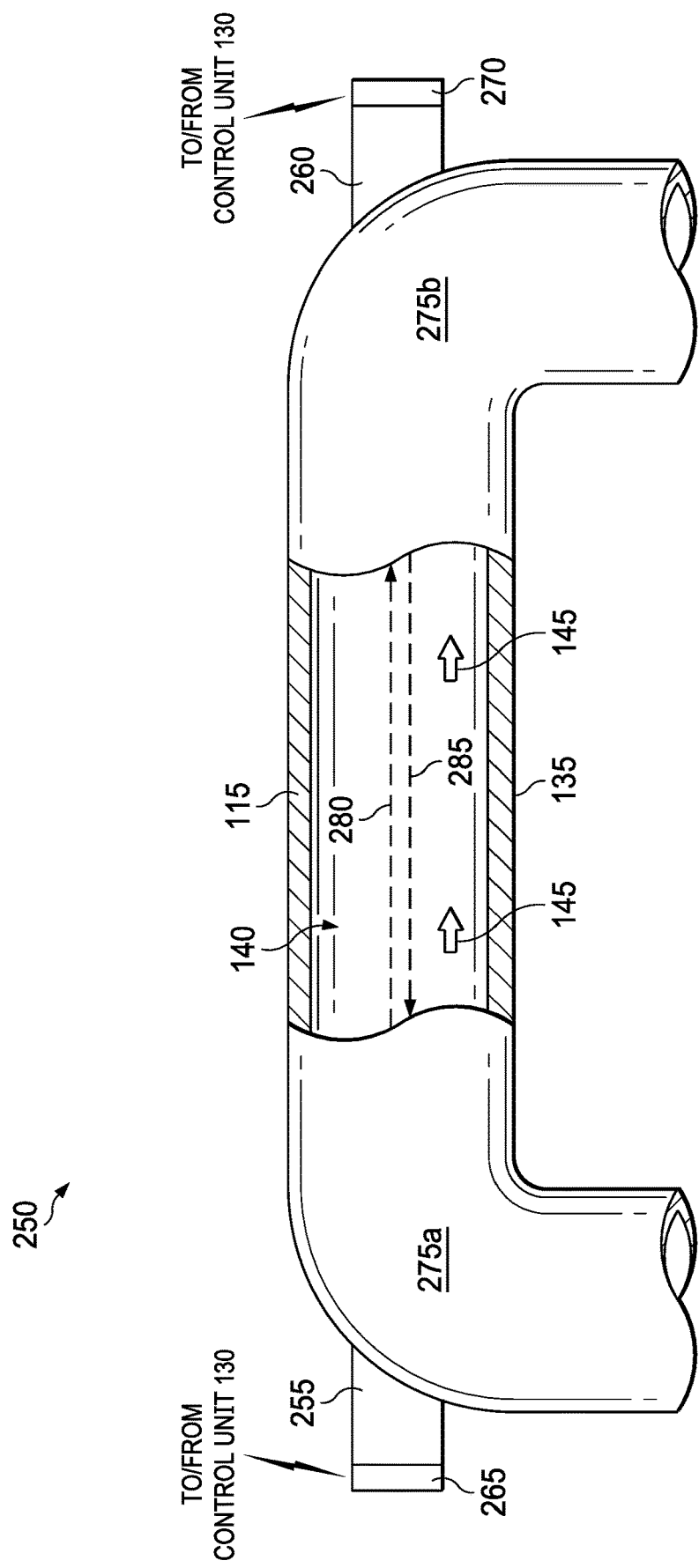
FIG. 7 is a diagrammatic illustration of yet another system including a pair of waveguides connected to a pipe, a pair of transducers connected to the waveguides, and a control unit in communication with the pair of transducers, according to one or more embodiments of the present disclosure.

In an exemplary embodiment, as illustrated in FIG. 7, a system is schematically illustrated and generally referred to by the reference numeral 250. The system 250 includes one or more feature(s)/component(s) that are substantially identical to corresponding feature(s)/component(s) of the system 100, which substantially identical feature(s)/component(s) are given the same reference numerals. However, the waveguides 110 and 120 and the transducers 105 and 125 are omitted from the system 250 and replaced with waveguides 255 and 260 (e.g., ultrasonic waveguides) and transducers 265 and 270 (e.g., ultrasonic wave transducers). The transducer 265 is connected to the waveguide 255, which, in turn, is connected to the pipe 115. Similarly, the transducer 270 is connected to the waveguide 260, which, in turn, is connected to the pipe 115. More particularly, in the embodiment of FIG. 7, the pipe 115 includes a U-bend defining opposing corners 275a and 275b at which the waveguides 255 and 260, respectively, are connected to the external surface 135 of the pipe 115. The control unit 130 is in wireless communication with the transducers 255 and 260, as shown in FIG. 7. In addition to, or instead of, being in wireless communication with the transducers 255 and 260, the control unit 130 may be in communication with the transducers 255 and 260 via leads (not shown but, e.g., substantially identical to the leads 146 and 148 shown in FIG. 1). The transducers 255 and 260 are spaced along the pipe 115 and are located in alignment with each other at the opposing corners 275a and 275b of the pipe 115. In several exemplary embodiments, the waveguides 255 and 260 and the transducers 265 and 270 of the system 250 are substantially identical to the waveguides 110 and 120 and the transducers 105 and 125, respectively, of the system 100 and/or the waveguides 110 and 205 and the transducers 105 and 210, respectively, of the system 200, except for their differing location(s) on the pipe 115.

The transducer(s) 265 and/or 270 of the system 250 is/are configured to emit and receive ultrasonic wave signals that travel through the waveguides 255 and 260, the pipe 115, and the fluid 145 flowing in the pipe 115. For example, as shown in FIG. 7, the transducers 265 and 270 of the system 250 are configured to emit and receive ultrasonic wave signals that travel through the waveguides 255 and 260, the pipe 115, and the fluid 145 flowing in the pipe 115. However, in the embodiment of FIG. 7, the ultrasonic wave signals of interest are not reflected off the interior wall of the pipe 115, nor do they travel diagonally across the fluid 145 flowing through the pipe 115. Instead, the ultrasonic wave signals of interest pass through the fluid 145 directly from the interior wall of the pipe 115 at the corner 275a proximate the transducer 265 to the interior wall of the pipe 115 at the corner 275b proximate the transducer 270. Due to the flow of the fluid 145 flowing in the pipe 115, the transit time of the ultrasonic wave signals from the transducer 265 to the transducer 270 (as indicated by arrow 280) is shorter than the transit time of the ultrasonic wave signals from the transducer 270 to the transducer 265 (as indicated by arrow 285), and this transit time difference yields a precise measurement of the flow velocity and the mass/volumetric flow rate along the path of the ultrasonic wave signals 280 and 285. In several exemplary embodiments, the ultrasonic wave signals 280 and 285 travel in a parallel relation to the fluid 145 flowing in the pipe 115 for at least a portion of their transit between the interior wall of the pipe 115 at the corner 275a proximate the transducer 265 and the interior wall of the pipe 115 at the corner 275b proximate the transducer 270.

The operation of the system 250 is substantially identical to the operation of the system 200, except that, rather than passing through the fluid 145 directly from the interior wall of the pipe 115 proximate the transducer 105 to the interior wall of the pipe 115 proximate the transducer 210 along the paths 215 and 220, the ultrasonic wave signals generated by the transducer(s) 265 and/or 270 pass through the fluid 145 directly from the interior wall of the pipe 115 at the corner 275a proximate the transducer 265 to the interior wall of the pipe 115 at the corner 275b proximate the transducer 270 along the paths 280 and 285. Therefore, the operation of the system 250 will not be described in further detail.

Figure 8:
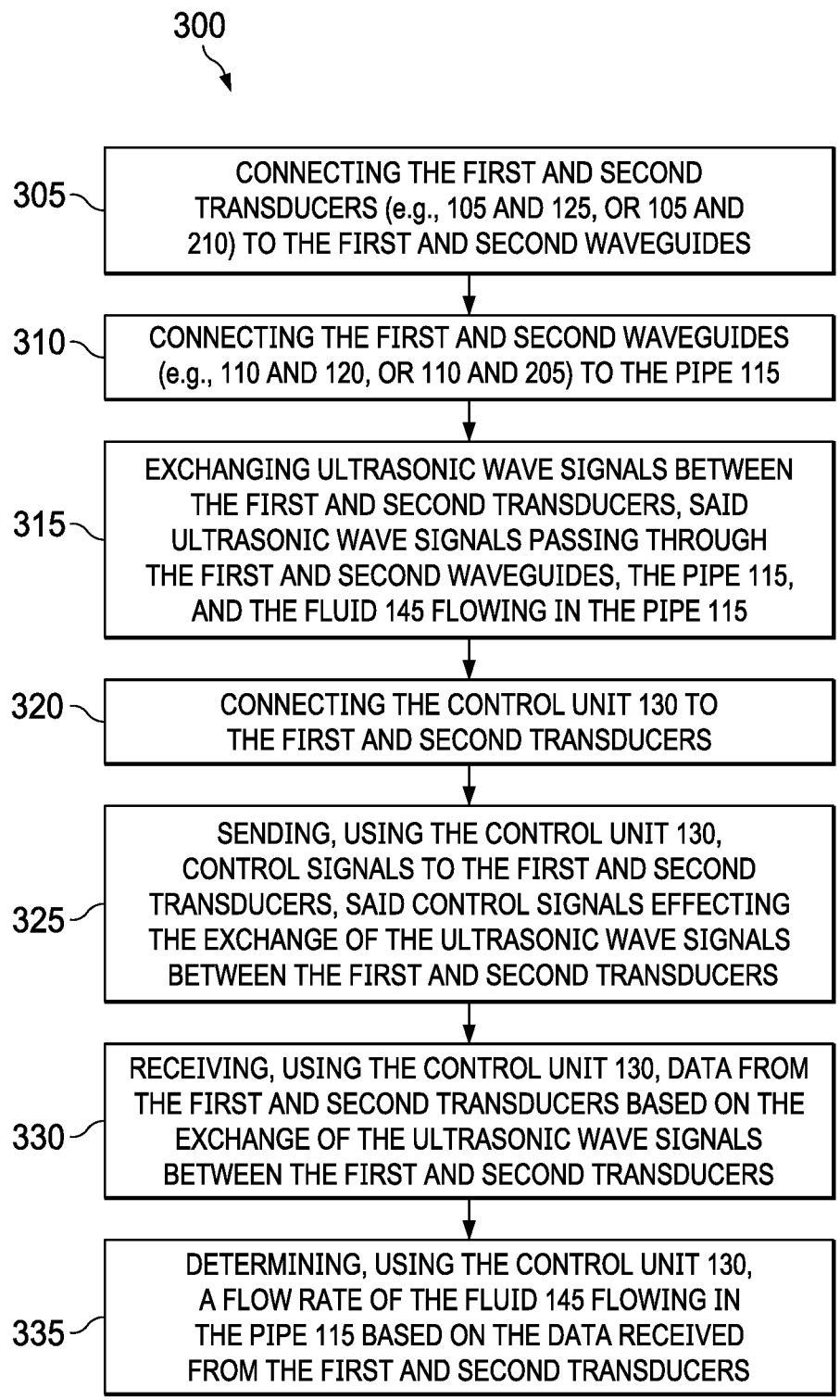
FIG. 8 is a flow chart illustration of a method of measuring a flow rate of a fluid flowing within a pipe, according to another illustrative embodiment.

In an exemplary embodiment, as illustrated in FIG. 8 with continuing reference to FIGS. 1, 2A-B, 3A-D, 4A-F, 5, 6, and 7, a method is generally referred to by the reference numeral 300. In several exemplary embodiments, the method 300 includes connecting the first and second transducers (e.g., 105 and 125, 105 and 210, or 265 and 270) to the first and second waveguides at a step 305, connecting the first and second waveguides (e.g., 110 and 120, 110 and 205, or 255 and 260) to the pipe 115 at a step 310, and exchanging ultrasonic wave signals between the first and second transducers, said ultrasonic wave signals passing through the first and second waveguides, the pipe 115, and the fluid 145 flowing in the pipe 115 at a step 315. In several exemplary embodiments, a temperature of the fluid 145 flowing in the pipe 115 exceeds about 600° C. In several exemplary embodiments, the first and second waveguides insulate the first and second transducers from the pipe 115 and propagate the ultrasonic wave signals between the pipe 115 and the first and second transducers, respectively, so that the ability of the first and second transducers to exchange the ultrasonic wave signals is not adversely affected by the temperature of the fluid 145 flowing in the pipe 115. In several exemplary embodiments, the method 300 also includes placing the control unit 130 in communication with the first and second transducers at a step 320, sending, using the control unit 130, control signals to the first and second transducers, said control signals effecting the exchange of the ultrasonic wave signals between the first and second transducers at a step 325, receiving, using the control unit 130, data from the first and second transducers based on the exchange of the ultrasonic wave signals between the first and second transducers at a step 330, and determining, using the control unit 130, a flow rate of the fluid 145 flowing in the pipe 115 based on the data received from the first and second transducers at a step 335.

In several exemplary embodiments, each of the system 100, the system 200, the system 250, and the method 300 is suitable for measuring flow rates (and hence volumetric rates) at higher temperatures without mechanical measurements inside the pipe 115. Accordingly, each of the system 100, the system 200, the system 250, and the method 300 overcomes mechanical limitations imposed by the higher temperature ranges, enabling sonic measurements at higher temperature measurements of flow rates via the waveguides 110 and 120, 110 and 205, or 255 and 260 and their properties.

Figure 9:
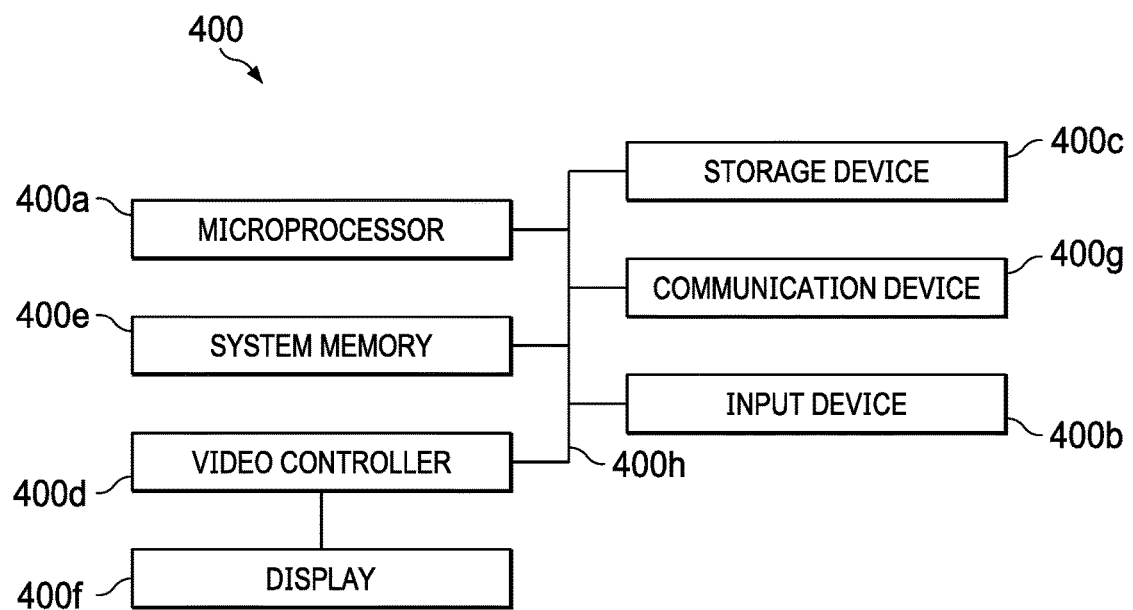
FIG. 9 is a diagrammatic illustration of a computing device for implementing one or more exemplary embodiments of the present disclosure.

In an exemplary embodiment, as illustrated in FIG. 9 with continuing reference to FIGS. 1, 2A-B, 3A-D, 4A-F, 5, 6, 7, and 8, a computing device 400 for implementing one or more embodiments of one or more of the above-described systems (100, 200, and/or 250), control units (e.g., 130), methods (e.g., 300) and/or steps (e.g. 305, 310, 315, 320, 325, 330, and/or 335), and/or any combination thereof, is depicted. The computing device 400 includes a microprocessor 400a, an input device 400b, a storage device 400c, a video controller 400d, a system memory 400e, a display 400f, and a communication device 400g all interconnected by one or more buses 400h. In several exemplary embodiments, the storage device 400c may include a floppy drive, hard drive, CD-ROM, optical drive, any other form of storage device and/or any combination thereof. In several exemplary embodiments, the storage device 400c may include, and/or be capable of receiving, a floppy disk, CD-ROM, DVD-ROM, or any other form of computer-readable medium that may contain executable instructions. In several exemplary embodiments, the communication device 400g may include a modem, network card, or any other device to enable the computing device to communicate with other computing devices. In several exemplary embodiments, any computing device represents a plurality of interconnected (whether by intranet or internet) computer systems, including without limitation, personal computers, mainframes, PDAs, smartphones and cell phones.

In several exemplary embodiments, one or more of the components of the above-described embodiments include at least the computing device 400 and/or components thereof, and/or one or more computing devices that are substantially similar to the computing device 400 and/or components thereof. In several exemplary embodiments, one or more of the above-described components of the computing device 400 include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several exemplary embodiments, data structures are defined organizations of data that may enable an exemplary embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the internet. In several exemplary embodiments, more than one database may be implemented.

In several exemplary embodiments, a plurality of instructions stored on a non-transitory computer readable medium may be executed by one or more processors to cause the one or more processors to carry out or implement in whole or in part the above-described operation of each of the above-described embodiments of the system 100, the system 200, the system 250, the method 300, and/or any combination thereof. In several exemplary embodiments, such a processor may include one or more of the microprocessor 400a, the processor 175, and/or any combination thereof, and such a non-transitory computer readable medium may include the storage device 400c, the system memory 400e, the computer readable medium 180, and/or may be distributed among one or more components of the system 100, the system 200, and/or the system 250. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces an apparatus, the apparatus including: first and second waveguides adapted to be connected to a pipe; and first and second transducers adapted to be connected to the first and second waveguides, respectively, and to exchange ultrasonic wave signals through the first and second waveguides, the pipe, and a fluid flowing in the pipe; wherein a temperature of the fluid flowing in the pipe exceeds about 600° C.; and wherein, when the first and second transducers are connected to the first and second waveguides, respectively, and the first and second waveguides are connected to the pipe, the first and second waveguides insulate the first and second transducers from the pipe and propagate the ultrasonic wave signals between the pipe and the first and second transducers, respectively, so that the ability of the first and second transducers to exchange the ultrasonic wave signals is not adversely affected by the temperature of the fluid flowing in the pipe. In several exemplary embodiments, the apparatus further includes a control unit adapted to be in communication with the first and second transducers; wherein, when the control unit is in communication with the first and second transducers, the control unit is further adapted to send control signals to the first and second transducers, said control signals effecting the exchange of the ultrasonic wave signals between the first and second transducers, to receive data from the first and second transducers based on the exchange of the ultrasonic wave signals between the first and second transducers, and to determine a flow rate of the fluid flowing in the pipe based on the data received from the first and second transducers. In several exemplary embodiments, at least respective portions of the first and second waveguides are made of a high-temperature ceramic material. In several exemplary embodiments, at least respective portions of the first and second waveguides are made of a calcium silicate technical ceramic. In several exemplary embodiments, when the first and second transducers are connected to the first and second waveguides, respectively, and the first and second waveguides are connected to the pipe, the first and second waveguides support the first and second transducers in a manner that permits propagation of the ultrasonic wave signals through the first and second waveguides at an angle greater than or equal to about 40 degrees and less than or equal to about 70 degrees with respect to a longitudinal axis of the pipe. In several exemplary embodiments, the first and second waveguides are each formed in the shape of a prism. In several exemplary embodiments, the first and second waveguides are each tapered so that contact areas between each of the first and second waveguides and the pipe are smaller than contact areas between the first and second waveguides and the first and second transducers, respectively. In several exemplary embodiments, the first and second waveguides are each machined to include a surface configured to matingly engage an external surface of the pipe. In several exemplary embodiments, the apparatus further includes the pipe, wherein either: an external surface of the pipe is machined to include surfaces configured to matingly engage the first and second waveguides; or material is added to an external surface of the pipe to form surfaces configured to matingly engage the first and second waveguides. In several exemplary embodiments, the first transducer is connected to the first waveguide via a connector ring; a recess in which the connector ring extends is formed in a portion of the first waveguide; and the connector ring: is made of a material more ductile and/or less brittle than a material of which the portion of the first waveguide is made, and/or includes an internal threaded connection threadably engaged by the first transducer. In several exemplary embodiments, the apparatus further includes the pipe, wherein the pipe includes a U-bend defining opposing first and second corners at which the first and second waveguides, respectively, are connected to the pipe; wherein the ultrasonic wave signals pass through the fluid flowing in the pipe directly from a first interior wall of the pipe at the first corner to a second interior wall of the pipe at the second corner. In several exemplary embodiments, the ultrasonic wave signals travel in a parallel relation to the fluid flowing in the pipe during at least a portion of their passage between the first interior wall of the pipe at the first corner and the second interior wall of the pipe at the second corner.

The present disclosure also introduces a system, including a non-transitory computer readable medium; and a plurality of instructions stored on the non-transitory computer readable medium and executable by one or more processors, the plurality of instructions including: instructions that cause the one or more processors to send control signals to first and second transducers, said control signals effecting an exchange of ultrasonic wave signals between the first and second transducers, and said ultrasonic wave signals passing through first and second waveguides, a pipe, and a fluid flowing in the pipe; instructions that cause the one or more processors to receive data from the first and second transducers based on the exchange of the ultrasonic wave signals between the first and second transducers; and instructions that cause the one or more processors to determine a flow rate of the fluid flowing in the pipe based on the data received from the first and second transducers; wherein a temperature of the fluid flowing in the pipe exceeds about 600° C. In several exemplary embodiments, the system further includes the first and second waveguides, which are adapted to be connected to the pipe; and the first and second transducers, which are adapted to be connected to the first and second waveguides, respectively; wherein the first and second waveguides insulate the first and second transducers from the pipe and propagate the ultrasonic wave signals between the pipe and the first and second transducers, respectively, so that the ability of the first and second transducers to exchange the ultrasonic wave signals is not adversely affected by the temperature of the fluid flowing in the pipe. In several exemplary embodiments, the system further includes a control unit including the non-transitory computer readable medium and the one or more processors, the control unit being adapted to be in communication with the first and second transducers. In several exemplary embodiments, at least respective portions of the first and second waveguides are made of a high-temperature ceramic material. In several exemplary embodiments, at least respective portions of the first and second waveguides are made of a calcium silicate technical ceramic. In several exemplary embodiments, the first and second waveguides are each formed in the shape of a prism. In several exemplary embodiments, the first and second waveguides are each tapered so that contact areas between each of the first and second waveguides and the pipe are smaller than contact areas between the first and second waveguides and the first and second transducers, respectively. In several exemplary embodiments, the first transducer is connected to the first waveguide via a connector ring; a recess in which the connector ring extends is formed in a portion of the first waveguide; and the connector ring: is made of a material more ductile and/or less brittle than a material of which the portion of the first waveguide is made, and/or includes an internal threaded connection threadably engaged by the first transducer. In several exemplary embodiments, the system further includes the pipe, wherein the pipe includes a U-bend defining opposing first and second corners at which the first and second waveguides, respectively, are connected to the pipe; wherein the ultrasonic wave signals pass through the fluid flowing in the pipe directly from a first interior wall of the pipe at the first corner to a second interior wall of the pipe at the second corner. In several exemplary embodiments, the ultrasonic wave signals travel in a parallel relation to the fluid flowing in the pipe during at least a portion of their passage between the first interior wall of the pipe at the first corner and the second interior wall of the pipe at the second corner.

The present disclosure also introduces a method, the method including: connecting first and second transducers to first and second waveguides, respectively; connecting the first and second waveguides to a pipe; and exchanging ultrasonic wave signals between the first and second transducers, said ultrasonic wave signals passing through the first and second waveguides, the pipe, and a fluid flowing in the pipe; wherein a temperature of the fluid flowing in the pipe exceeds about 600° C.; and wherein the first and second waveguides insulate the first and second transducers from the pipe and propagate the ultrasonic wave signals between the pipe and the first and second transducers, respectively, so that the ability of the first and second transducers to exchange the ultrasonic wave signals is not adversely affected by the temperature of the fluid flowing in the pipe. In several exemplary embodiments, the method further includes: placing a control unit in communication with the first and second transducers; sending, using the control unit, control signals to the first and second transducers, said control signals effecting the exchange of the ultrasonic wave signals between the first and second transducers; receiving, using the control unit, data from the first and second transducers based on the exchange of the ultrasonic wave signals between the first and second transducers; and determining, using the control unit, a flow rate of the fluid flowing in the pipe based on the data received from the first and second transducers. In several exemplary embodiments, at least respective portions of the first and second waveguides are made of a high-temperature ceramic material. In several exemplary embodiments, at least respective portions of the first and second waveguides are made of a calcium silicate technical ceramic. In several exemplary embodiments, the method further includes supporting the first and second transducers in a manner that permits propagation of the ultrasonic wave signals through the first and second waveguides at an angle greater than or equal to about 40 degrees and less than or equal to about 70 degrees with respect to a longitudinal axis of the pipe. In several exemplary embodiments, the first and second waveguides are each formed in the shape of a prism. In several exemplary embodiments, the first and second waveguides are each tapered so that contact areas between each of the first and second waveguides and the pipe are smaller than contact areas between the first and second waveguides and the first and second transducers, respectively. In several exemplary embodiments, the method further includes machining the first and second waveguides to include a surface configured to matingly engage an external surface of the pipe. In several exemplary embodiments, the method further comprises either: machining an external surface of the pipe to include surfaces configured to matingly engage the first and second waveguides; or adding material to an external surface of the pipe to form surfaces configured to matingly engage the first and second waveguides. In several exemplary embodiments, connecting the first and second waveguides to the pipe includes connecting the first transducer to the first waveguide via a connector ring; wherein the connector ring: extends within a recess formed in the first waveguide and includes an internal threaded connection with which the first transducer is threadably engageable, and/or is made of a material more ductile and/or less brittle than a material of which the portion of the first waveguide is made. In several exemplary embodiments, connecting the first and second waveguides to the pipe includes connecting the first and second waveguides to the pipe at opposing first and second corners, respectively, defined by a U-bend of the pipe so that the ultrasonic wave signals pass through the fluid flowing in the pipe directly from a first interior wall of the pipe at the first corner to a second interior wall of the pipe at the second corner. In several exemplary embodiments, the ultrasonic wave signals travel in a parallel relation to the fluid flowing in the pipe during at least a portion of their passage between the first interior wall of the pipe at the first corner and the second interior wall of the pipe at the second corner.

In the present disclosure, the term "about" is used to indicate the value stated immediately thereafter, but also may include a range of values above or below the stated value (e.g., +/−1%, 2%, 3%, 4%, 5%, 10%, 15%, 20%, or 25%).

It is understood that variations may be made in the foregoing without departing from the scope of the present disclosure.

In several exemplary embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. An apparatus, comprising:
   first and second waveguides adapted to be connected to a pipe; and
   first and second transducers adapted to be connected to the first and second waveguides, respectively, and to exchange ultrasonic wave signals through the first and second waveguides, the pipe, and a fluid flowing in the pipe;
   wherein a temperature of the fluid flowing in the pipe exceeds about 600° C.; and
   wherein the first and second waveguides are configured so that, when the first and second transducers are connected to the first and second waveguides, respectively, and
   the first and second waveguides are connected to the pipe:
   the first and second waveguides insulate the first and second transducers from the pipe thereby causing a working temperature of the first and second transducers to be maintained below a first threshold despite the temperature of the fluid flowing in the pipe exceeding about 600+ C., above which first threshold the working temperature would cause the first and second transducers to fail; and
   the first and second waveguides maintain an acoustic attenuation of the ultrasonic wave signals below a second threshold thereby permitting propagation of the ultrasonic wave signals between the pipe and the first and second transducers, respectively, in a manner that does not adversely affect the ability of the first and second transducers to exchange the ultrasonic wave signals despite the temperature of the fluid flowing in the pipe exceeding about 600° C., above which second threshold the acoustic attenuation would prevent propagation of the ultrasonic wave signals in said manner.

2. The apparatus of claim 1, further comprising a control unit adapted to be in communication with the first and second transducers;
   wherein, when the control unit is in communication with the first and second transducers, the control unit is further adapted to send control signals to the first and second transducers, said control signals effecting the exchange of the ultrasonic wave signals between the first and second transducers, to receive data from the first and second transducers based on the exchange of the ultrasonic wave signals between the first and second transducers, and to determine a flow rate of the fluid flowing in the pipe based on the data received from the first and second transducers.

3. The apparatus of claim 1, wherein at least respective portions of the first and second waveguides are made of a high-temperature ceramic material.

4. The apparatus of claim 3, wherein at least respective portions of the first and second waveguides are made of a calcium silicate technical ceramic.

5. The apparatus of claim 1, wherein, when the first and second transducers are connected to the first and second waveguides, respectively, and the first and second waveguides are connected to the pipe, the first and second waveguides support the first and second transducers in a manner that permits propagation of the ultrasonic wave signals through the first and second waveguides at an angle greater than or equal to about 40 degrees and less than or equal to about 70 degrees with respect to a longitudinal axis of the pipe.

6. The apparatus of claim 1, wherein the first and second waveguides are each formed in the shape of a prism.

7. The apparatus of claim 6, wherein the first and second waveguides are each tapered so that contact areas between each of the first and second waveguides and the pipe are smaller than contact areas between the first and second waveguides and the first and second transducers, respectively.

8. The apparatus of claim 1, wherein the first and second waveguides are each machined to include a surface configured to matingly engage an external surface of the pipe.

9. The apparatus of claim 1, further comprising the pipe, wherein either:
an external surface of the pipe is machined to include surfaces configured to matingly engage the first and second waveguides; or
material is added to an external surface of the pipe to form surfaces configured to matingly engage the first and second waveguides.

10. The apparatus of claim 1, wherein the first transducer is connected to the first waveguide via a connector ring;
wherein a recess in which the connector ring extends is formed in a portion of the first waveguide; and
wherein the connector ring:
is made of a material more ductile and/or less brittle than a material of which the portion of the first waveguide is made; and/or
includes an internal threaded connection threadably engaged by the first transducer.

11. The apparatus of claim 1, further comprising:
the pipe, wherein the pipe includes a U-bend defining opposing first and second corners at which the first and second waveguides, respectively, are connected to the pipe;
wherein the ultrasonic wave signals pass through the fluid flowing in the pipe directly from a first interior wall of the pipe at the first corner to a second interior wall of the pipe at the second corner.

12. The apparatus of claim 11, wherein the ultrasonic wave signals travel in a parallel relation to the fluid flowing in the pipe during at least a portion of their passage between the first interior wall of the pipe at the first corner and the second interior wall of the pipe at the second corner.

13. A method, comprising:
connecting first and second transducers to first and second waveguides, respectively;
connecting the first and second waveguides to a pipe; and
exchanging ultrasonic wave signals between the first and second transducers, said ultrasonic wave signals passing through the first and second waveguides, the pipe, and a fluid flowing in the pipe;
wherein a temperature of the fluid flowing in the pipe exceeds about 600° C.; and
wherein the method further comprises:
insulating, using the first and second waveguides, the first and second transducers from the pipe thereby causing a working temperature of the first and second transducers to be maintained below a first threshold despite the temperature of the fluid flowing in the pipe exceeding about 600° C., above which first threshold the working temperature would cause the first and second transducers to fail; and
maintaining, using the first and second waveguides, an acoustic attenuation of the ultrasonic wave signals below a second threshold thereby permitting propagation of the ultrasonic wave signals between the pipe and the first and second transducers, respectively, in a manner that does not adversely affect the ability of the first and second transducers to exchange the ultrasonic wave signals despite the temperature of the fluid flowing in the pipe exceeding about 600° C., above which second threshold the acoustic attenuation would prevent propagation of the ultrasonic wave signals in said manner.

14. The method of claim 13, further comprising:
placing a control unit in communication with the first and second transducers;
sending, using the control unit, control signals to the first and second transducers, said control signals effecting the exchange of the ultrasonic wave signals between the first and second transducers;
receiving, using the control unit, data from the first and second transducers based on the exchange of the ultrasonic wave signals between the first and second transducers; and
determining, using the control unit, a flow rate of the fluid flowing in the pipe based on the data received from the first and second transducers.

15. The method of claim 13, wherein at least respective portions of the first and second waveguides are made of a high-temperature ceramic material.

16. The method of claim 15, wherein at least respective portions of the first and second waveguides are made of a calcium silicate technical ceramic.

17. The method of claim 13, further comprising supporting the first and second transducers in a manner that permits propagation of the ultrasonic wave signals through the first and second waveguides at an angle greater than or equal to about 40 degrees and less than or equal to about 70 degrees with respect to a longitudinal axis of the pipe.

18. The method of claim 13, wherein the first and second waveguides are each formed in the shape of a prism.

19. The method of claim 18, wherein the first and second waveguides are each tapered so that contact areas between each of the first and second waveguides and the pipe are smaller than contact areas between the first and second waveguides and the first and second transducers, respectively.

20. The method of claim 13, machining the first and second waveguides to include a surface configured to matingly engage an external surface of the pipe.

21. The method of claim 13, further comprising either:
machining an external surface of the pipe to include surfaces configured to matingly engage the first and second waveguides; or
adding material to an external surface of the pipe to form surfaces configured to matingly engage the first and second waveguides.

22. The method of claim 13, wherein connecting the first and second waveguides to the pipe comprises connecting the first transducer to the first waveguide via a connector ring;
wherein the connector ring:
extends within a recess formed in the first waveguide and includes an internal threaded connection with which the first transducer is threadably engageable; and/or
is made of a material more ductile and/or less brittle than a material of which the portion of the first waveguide is made.

23. The method of claim 13, wherein connecting the first and second waveguides to the pipe comprises:

connecting the first and second waveguides to the pipe at opposing first and second corners, respectively, defined by a U-bend of the pipe so that the ultrasonic wave signals pass through the fluid flowing in the pipe directly from a first interior wall of the pipe at the first corner to a second interior wall of the pipe at the second corner.

24. The method of claim 23, wherein the ultrasonic wave signals travel in a parallel relation to the fluid flowing in the pipe during at least a portion of their passage between the first interior wall of the pipe at the first corner and the second interior wall of the pipe at the second corner.

* * * * *